United States Patent
Beeck

[11] Patent Number: 6,012,723
[45] Date of Patent: Jan. 11, 2000

[54] BRUSH GASKET

[75] Inventor: Alexander Beeck, Küssaberg, Germany

[73] Assignee: Asea Brown Boveri AG, Baden, Switzerland

[21] Appl. No.: 08/919,321

[22] Filed: Aug. 28, 1997

[30] Foreign Application Priority Data

Oct. 4, 1996 [DE] Germany .................. 194 40 979

[51] Int. Cl.⁷ .................................................. F16J 15/44
[52] U.S. Cl. ........................ 277/355; 277/917; 277/415
[58] Field of Search .................... 277/355, 917, 277/415

[56] References Cited

U.S. PATENT DOCUMENTS

| | | | |
|---|---|---|---|
| 2,732,232 | 1/1956 | Whitfield | 277/415 |
| 3,575,427 | 4/1971 | Lapac | 277/415 |
| 4,207,024 | 6/1980 | Bill et al. | 277/415 |
| 4,566,700 | 1/1986 | Shiembob | 277/415 |
| 4,595,207 | 6/1986 | Popp | 277/355 |
| 5,026,252 | 6/1991 | Hoffelner | 277/355 |
| 5,308,088 | 5/1994 | Atkinson et al. | |
| 5,314,304 | 5/1994 | Wiebe | 277/415 |
| 5,474,306 | 12/1995 | Bagepalli et al. | 277/355 |

FOREIGN PATENT DOCUMENTS

| | | | |
|---|---|---|---|
| 000453315A1 | 10/1991 | European Pat. Off. | 277/355 |
| 4-347066 | 12/1992 | Japan . | |
| 2066382 | 7/1981 | United Kingdom . | |
| 001598926 | 9/1981 | United Kingdom | 277/355 |
| 1598926 | 9/1981 | United Kingdom . | |

*Primary Examiner*—Brian K. Green
*Assistant Examiner*—Marcus Dolce
*Attorney, Agent, or Firm*—Burns, Doane, Swecker & Mathis, L.L.P.

[57] ABSTRACT

A brush gasket for two co-operating components located opposite one another. The brush gasket has a carrier body for the brushes arranged on one of the two components to be sealed off relative to one another, for example, a stator and a rotor. The carrier body has a supporting wall for the brushes on the low-pressure side, in order to protect them against pressure-related deformation. On the second of the components, opposite the carrier body, there is an abrasion ring made of a material which is softer than the material of the brushes. The abrasion ring together with the brushes thus forms a gasket group.

8 Claims, 1 Drawing Sheet

BRUSH GASKET

BACKGROUND OF THE INVENTION

1. Field of the Invention

The invention relates to a brush gasket according to the preamble of patent claim 1.

2. Discussion of Background

In one embodiment of a brush gasket according to the prior art [FIG. 1], a supporting wall of the carrier body has the function of supporting the brush fibers against the force originating from the pressure on the high-pressure side and of thereby keeping sealing losses lower. The higher the pressure on the high-pressure side, the smaller the gap between the supporting wall and the opposite component must be, in order to ensure that the brushes, that is to say the fibers forming them, do not spring back too far and thus give rise to a sealing gap which is too large.

In such a brush gasket, however, it is not possible to fall below a clearance which is necessary on account of the installation stipulations or the thermal and rotor-dynamic conditions. However, this clearance may be too large for the pressure ratios on the high-pressure and the low-pressure sides and, in particular, may increase in size during the operating period.

SUMMARY OF THE INVENTION

Accordingly, one object of the invention is to provide a novel brush gasket which, on the one hand, takes into account the thermal and rotor-dynamic conditions and those stipulated as a consequence of installation, but, on the other hand, makes it possible to have a smaller sealing gap in comparison with conventional brush gaskets.

This object is achieved by means of the features of the defining part of claim 1. The features of the dependent claims describe advantageous embodiments of such a brush gasket.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

Only the elements essential for understanding the invention are shown. Of the plant, for example the mounting of the rotor, the anchoring of the brush insert, etc. are not illustrated.

DESCRIPTION OF THE PREFERRED EMBODIMENTS

Figure 1:
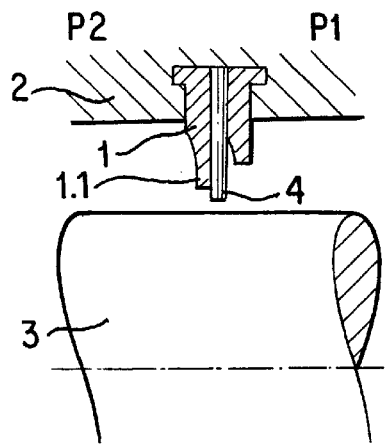
FIG. 1 shows a brush gasket according to the prior art.
Figure 2:
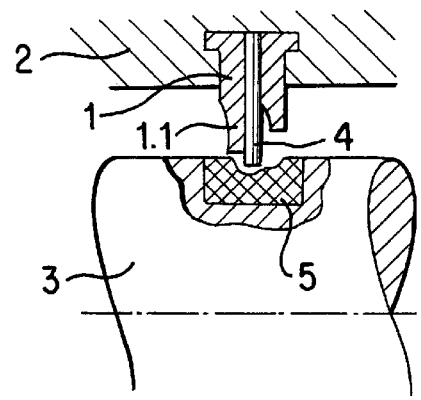
FIG. 2 shows a first variant of a brush gasket according to the invention.

Referring now to the drawings, wherein like reference numerals designate identical or corresponding parts throughout the several views, a brush gasket [FIG. 2] for two co-operating components of a plant with a high-pressure and a low-pressure side has essentially a carrier body 1 which is embedded into one of the two components 2 to be sealed off relative to one another, for example a stator, and which receives the brushes 4. The carrier body 1 possesses preferably a supporting wall 1.1 which supports the fibers of the brushes 4 against the pressure on the high-pressure side and which reduces pressure-related deflection and consequently gap losses. In order to keep these as low as possible, the gap between the supporting wall 1.1 and the opposite component 3, for example a rotor, is kept as small as possible by design. However, the thermal expansions and the rotor-dynamic movements, for example the pressure-induced deflection, place limits on this. Also, the brushes experience wear due to abrasion on the opposite component 3, with the result that the sealing gap becomes larger during operation. Moreover, the surface of the opposite component may be damaged by the friction of the brush fibers. Opposite the carrier body 1, an abrasion ring 5 made of a softer material than that of the brush fibers, preferably a material capable of being abraded by the brush fibers, is affixed, for example injection-molded, or inserted on the other component 3 and co-operates with the brushes 4. In other words, the abrasion ring 5 can be described as possessing a lower hardness, rather than being described as being softer than the brush fibers 4, as determined by Moh's Hardness Scale. Moh's Hardness Scale ranks the ability of one material to scratch another by assigning a number from 1 to 10 to the material, with 10 being the hardest material and 1 the softest material. So that if a material with a lower hardness number is brought into contact with another material having a higher hardness, the material with the lower hardness will be abraded. As newly manufactured, the brushes 4 and the abrasion ring 5 essentially touch one another. During operation, due to the relative movements of the two plant components 2,3 the brushes may strip off material from the sealing ring, with the result that an operating sealing groove 5.1 is formed. This does not constitute a disadvantage, because it acts in the manner of a labyrinth gasket and, in the case of a suitable design of the supporting wall, brush and abrasion ring, may even increase the sealing effect. In particular, it is possible, from the outset, to produce a design-related sealing groove for the brush and carrier body and thus achieve a sort of labyrinth gasket effect. By virtue of the abradable abrasion ring 5, the overall gap between the co-operating plant components 2,3 may also be kept smaller than customary hitherto, thus likewise leading to lower leakage losses. Furthermore, this avoids the supporting wall 1.1 being damaged by the opposite component 3 or the opposite component being damaged by the former, which may be essential particularly during passages through critical rotational speed ranges.

Figure 3:
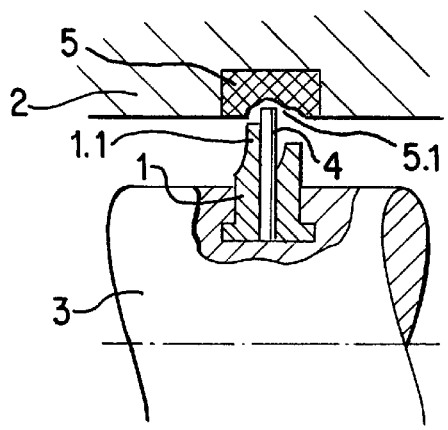
FIG. 3 shows a second variant of a brush gasket according to the invention.
Figure 4:
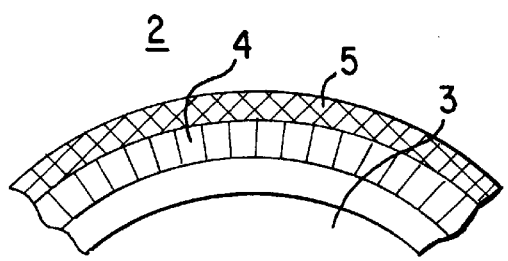
FIG. 4 shows a brush gasket with obliquely arranged brushes.

In a second variant [FIG. 3] a reversed arrangement is provided, that is to say the brush gasket is arranged on the rotor 3 and the abradable abrasion ring 5 on the stator 2. The effects and advantages are essentially the same, but the other technical conditions of this variant may have additional advantages, for example simplified installation or the like.

In both variants, the brushes 4 of the brush gasket may be arranged obliquely to the shaft axis. Particularly in the case of the second variant, this has the additional advantage that the brush fibers stand up radially under the effect of centrifugal force and thus result in a smaller sealing gap during operation. This also allows simpler assembly of the plant components.

Again in both variants, instead of abrasion rings 5 which can be inserted or attached, a layer of abradable material may be applied in corresponding regions to the corresponding components, for example by thermal spraying.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A brush gasket arranged between two co-pending components located opposite one another comprising:

a carrier body arranged on one of the two components which are to be sealed off relative to one another, said carrier body carrying brushes made from brush fibers having a first softness and having a supporting wall for the brushes on a low-pressure side, wherein another of the two components carries, opposite the carrier body, an abrasion ring made of a material having a second softness, wherein the second softness has a lower hardness than the first softness such that the material of said abrasion ring is abraded by the brush fibers, said abrasion ring together with the brushes forming a gasket group.

2. The brush gasket as claimed in claim 1, wherein the abrasion ring is designed as an individual component which can be inserted or attached.

3. The brush gasket as claimed in claim 1, wherein the abrasion ring is designed as an applied material layer.

4. The brush gasket as claimed in claim 1, wherein the abrasion ring is equipped with a sealing groove, into which the brushes or the brushes together with part of the carrier body engages.

5. The brush gasket as claimed in claim 1, wherein the two co-pending components include a rotor and a stator, the carrier body having the brushes is arranged on the rotor and the abrasion ring is arranged on the stator.

6. The brush gasket as claimed in claim 1, wherein the two co-pending components include a rotor and a stator, the carrier body having the brushes is arranged on the stator and the abrasion ring is arranged on the rotor.

7. The brush gasket as claimed in claim 1, wherein the two co-pending components include a rotor and a stator, and at least one of the brushes is arranged obliquely to an axis of the rotor, in order to stand up under a sufficiently high centrifugal force and consequently reduce the size of a sealing gap.

8. The brush gasket as claimed in claim 1, wherein the brushes touch the abrasion ring at least when the brushes and the abrasion ring are newly manufactured.

* * * * *